United States Patent [19]
Ishibe

[11] Patent Number: 5,812,181
[45] Date of Patent: Sep. 22, 1998

[54] SCANNING OPTICAL APPARATUS

[75] Inventor: Yoshihiro Ishibe, Kawasaki, Japan

[73] Assignee: Canon Kabushiki Kaisha, Tokyo, Japan

[21] Appl. No.: 824,791

[22] Filed: Mar. 26, 1997

[30] Foreign Application Priority Data

Mar. 29, 1996 [JP] Japan .................................. 8-103369
Mar. 18, 1997 [JP] Japan .................................. 9-084430

[51] Int. Cl.$^6$ ........................................................ B41J 2/47
[52] U.S. Cl. ........................................ 347/258; 359/662
[58] Field of Search ................................... 347/258, 259, 347/241, 134; 359/662, 719, 728, 716–718, 205

[56] References Cited

U.S. PATENT DOCUMENTS

| 5,111,219 | 5/1992 | Makino . | |
|---|---|---|---|
| 5,673,136 | 9/1997 | Inoue et al. | 359/205 |
| 5,737,112 | 7/1998 | Iizuka | 359/208 |

FOREIGN PATENT DOCUMENTS

| 62-138823 | 6/1987 | Japan . |
| 63-157122 | 6/1988 | Japan . |
| 4-50908 | 2/1992 | Japan . |
| 4-104213 | 4/1992 | Japan . |

*Primary Examiner*—Mark N. Reinhart
*Attorney, Agent, or Firm*—Fitzpatrick, Cella, Harper & Scinto

[57] ABSTRACT

A scanning optical apparatus includes a light source, a first optical system for converting a light beam emitted from the light source into a focused beam, a deflector for deflecting the light beam emerging from the first optical system, and a second optical system for imaging the light beam deflected by the deflector into a spot image on a surface to be scanned. The second optical system is constituted by a single lens whose two lens surfaces have aspherical shapes in a main scanning plane, and
the following conditions are satisfied:

$$0 < R1 < |R2|$$
$$R2 < 0$$
$$(R1^2 - Y\max^2)^{1/2} - R1 < S1 < 0$$
$$|R2| - (R2^2 - Y\max^2)^{1/2} - d < S2 < 0$$
$$0.2 \leq 1 - Sk/ft \leq 0.5$$

where R1 is a paraxial radius of curvature of a deflector-side lens surface of the single lens, R2 is a paraxial radius of curvature of a surface to be scanned-side lens surface of the single lens, Ymax is a maximum effective diameter of the single lens in the main scanning plane, S1 is an aspherical amount from a paraxial lens surface of the deflector-side lens surface at the maximum effective diameter Ymax, S2 is an aspherical amount from a paraxial lens surface of the surface to be scanned-side lens surface at the maximum effective diameter Ymax, d is a central thickness of the single lens, ft is a focal length of the single lens in the main scanning plane, and Sk is a distance from the single lens to said surface to be scanned.

18 Claims, 7 Drawing Sheets

SCANNING OPTICAL APPARATUS

BACKGROUND OF THE INVENTION

1. Field of the Invention

The present invention relates to a scanning optical apparatus and, more particularly, to a scanning optical apparatus suitable for a laser beam printer (LBP) having an electrophotographic process or a digital copying machine, in which a light beam optically modulated and emitted from a light source means is deflectively reflected by an optical deflector (deflecting device) consisting of, e.g., a rotary polygonal mirror, and thereafter optically scans a target scanning surface through an imaging optical system (f-θ lens) having an f-θ characteristic to record image information.

2. Related Background Art

In a conventional scanning optical apparatus used for a laser beam printer or a digital copying machine, a light beam optically modulated and emitted from a light source means in accordance with an image signal is periodically deflected by an optical deflector consisting of, e.g., a rotary polygonal mirror (polygon mirror), and focused into a spot image on a photosensitive recording medium (photosensitive drum) through an imaging optical system having an f-θ characteristic, and the surface of the photosensitive recording medium is optically scanned to record an image.

Figure 1:
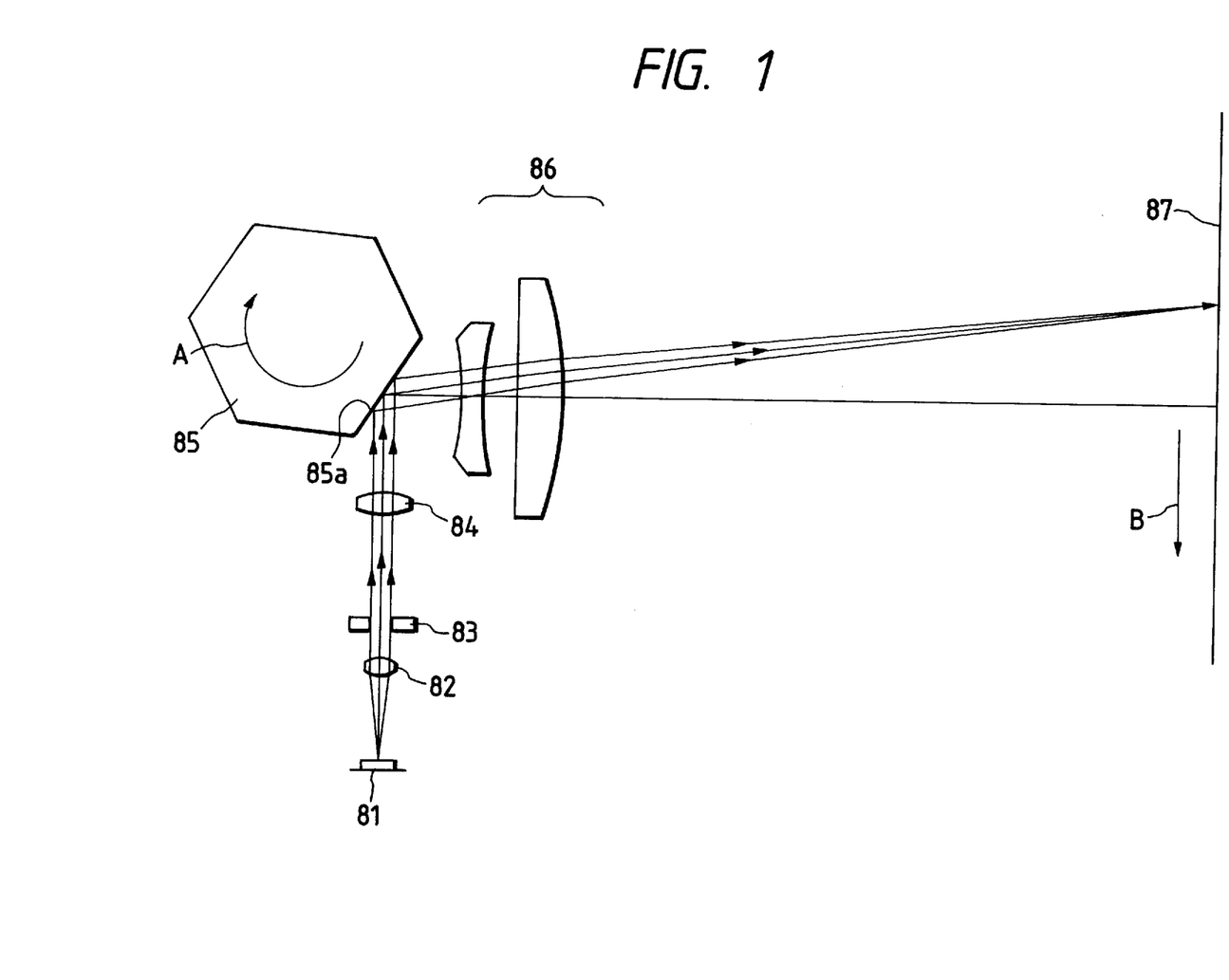
FIG. 1 is a schematic view of the main part of the optical system of a conventional scanning optical apparatus.

FIG. 1 is a sectional view schematically showing the main part of a conventional scanning optical apparatus of this type along the main scanning direction.

Referring to FIG. 1, a light beam emitted from a light source means 81 is almost collimated by a collimator lens 82. The light beam (light amount) is limited by a stop 83 and incident on a cylindrical lens 84 having a predetermined refracting power only in the sub scanning direction. The collimated beam incident on the cylindrical lens 84 directly emerges in the main scanning section. In the sub scanning section, the light beam is focused into an almost line image on a deflecting surface (reflecting surface) 85a of an optical deflector 85 consisting of a rotary polygonal mirror (polygon mirror).

The light beam deflectively reflected by the deflecting surface 85a of the optical deflector 85 is guided to a photosensitive drum surface 87 as a target scanning surface through an imaging optical system (f-θ lens) 86 having an f-θ characteristic. By rotating the optical deflector 85 in a direction indicated by an arrow A, the photosensitive drum surface 87 is optically scanned in a direction indicated by an arrow B. With this arrangement, an image is recorded on the photosensitive drum surface 87 serving as a recording medium.

To precisely record image information by the scanning optical apparatus of this type, the curvature of field must be satisfactorily corrected and the spot diameters must be equalized on the entire target scanning surface. Additionally, the lens must have a distortion aberration (f-θ characteristic) for establishing a proportional relation between the angle of incident light and the image height. Various scanning optical apparatuses which satisfy these optical characteristics and correction optical systems (f-θ lenses) therefor have been conventionally proposed.

As the size and cost of a laser beam printer or digital copying machine are reduced, the scanning optical apparatus is also required to be compact and inexpensive.

Various scanning optical apparatuses meeting these requirements, i.e., scanning optical apparatuses each having a single f-θ lens are disclosed in, e.g., Japanese Laid-Open Patent Application Nos. 62-138823, 63-157122, 4-104213, and 4-50908 (corresponding to U.S. Pat. No. 5,111,219).

In Japanese Laid-Open Patent Application No. 62-138823 or 63-157122, the collimated beam from the collimator lens is formed into an image on the target scanning surface. For this reason, the distance from the f-θ lens to the target scanning surface almost equals a focal length f, resulting in a difficulty in constituting a compact scanning optical apparatus. In addition, assuming molding, since the f-θ lens becomes thick, process conditions including the uniformity and distortion of the lens and the molding time are deteriorated, resulting in an increase in cost.

In Japanese Laid-Open Patent Application No. 4-104213, the focused beam from the collimator lens is formed into an image on the target scanning surface. For this reason, the distance from the f-θ lens to the target scanning surface can be reduced to realize a compact arrangement. However, the curvature of field can hardly be consistent with the f-θ characteristic (distortion aberration).

In this prior art, priority is given to correction of the curvature of field while the f-θ characteristic is only electrically corrected. In writing an image, the distortion in the written image must be corrected by continuously changing the timing of the image information. However, the speed of a spot on the target scanning surface always changes, and the light amount per unit time and per unit area on the target scanning surface changes, accordingly.

The above problem can be solved by continuously changing the laser beam amount. However, an increase in number of correction circuits cancels the advantage of the single lens structure.

In Japanese Laid-Open Patent Application No. 4-50908 (corresponding to U.S. Pat. No. 5,111,219), an aspherical f-θ lens of higher order is used. Although the aberration is satisfactorily corrected, the spot diameter in the sub scanning direction changes depending on the image height because the magnification in the sub scanning direction becomes nonuniform between the optical deflector and the target scanning surface.

SUMMARY OF THE INVENTION

It is an object of the present invention to provide a compact scanning optical apparatus which, when a focused beam from a collimator lens is to be formed into an image on a surface to be scanned through one f-θ lens, appropriately constitutes the shape of the f-θ lens to correct the field of curvature or distortion aberration and also prevent a jitter caused by an attachment error of an optical deflector or a change in spot diameter in a sub scanning direction caused by an image height, and is suitable for high-resolution printing.

According to the present invention, there is provided a scanning optical apparatus comprising:

a light source;

a first optical system for converting a light beam emitted from the light source into a focused beam;

a deflector for deflecting the light beam emerging from the first optical system; and a second optical system for imaging the light beam deflected by the deflector into a spot image on a surface to be scanned, wherein the second optical system is constituted by a single lens whose two lens surfaces have aspherical shapes in a main scanning plane, and the following conditions are satisfied:

$$0 < R1 < |R2|$$
$$R2 < 0$$
$$(R1^2 - Y\text{max}^2)^{1/2} - R1 < S1 < 0$$
$$|R2| - (R2^2 - Y\text{max}^2)^{1/2} - d < S2 < 0$$
$$0.2 \leq 1 - Sk/ft \leq 0.5$$

where

R1 is a paraxial radius of curvature of a deflector-side lens surface of the single lens, R2 is a paraxial radius of curvature of a surface to be scanned-side lens surface of the single lens, Ymax is a maximum effective diameter of the single lens in the main scanning plane;

S1 is an aspherical amount from a paraxial lens surface of the deflector-side lens surface at the maximum effective diameter Ymax, S2 is an aspherical amount from a paraxial lens surface of the surface to be scanned-side lens surface at the maximum effective diameter Ymax, d is a central thickness of the single lens, ft is a focal length of the single lens in the main scanning plane, and Sk is a distance from the single lens to the surface to be scanned.

In addition to the above conditions, in the optical scanning apparatus of the present invention, the two lens surfaces of the single lens consist of aspherical toric surfaces.

In addition to the above conditions, the optical scanning apparatus of the present invention further comprises a third optical system arranged between the first optical system and the deflector and having a refracting power only in a sub scanning direction, the third optical system forming, on a deflecting surface of the deflector, the light beam emerging from the first optical system into a line image long in a main scanning direction.

In addition to the above conditions, in the optical scanning apparatus of the present invention, the first optical system converts the light beam emitted from the light source into the focused beam in the main scanning plane.

In addition to the above conditions, in the optical scanning apparatus of the present invention, at least one of the two lens surfaces of the single lens has, in a sub scanning plane, a curvature which continuously changes within an effective range of the single lens.

In addition to the above conditions, in the optical scanning apparatus of the present invention, the second optical system has an optical axis tilted in a main scanning plane with respect to a normal of the target scanning surface.

In addition to the above conditions, in the optical scanning apparatus of the present invention, at least one of the two lens surfaces of the single lens has an asymmetrical shape with respect to an optical axis.

In addition to the above conditions, in the optical scanning apparatus of the present invention, the second optical system is manufactured by plastic molding.

In addition to the above conditions, in the optical scanning apparatus of the present invention, the second optical system is manufactured by glass molding.

DETAILED DESCRIPTION OF THE PREFERRED EMBODIMENTS

Figure 2:
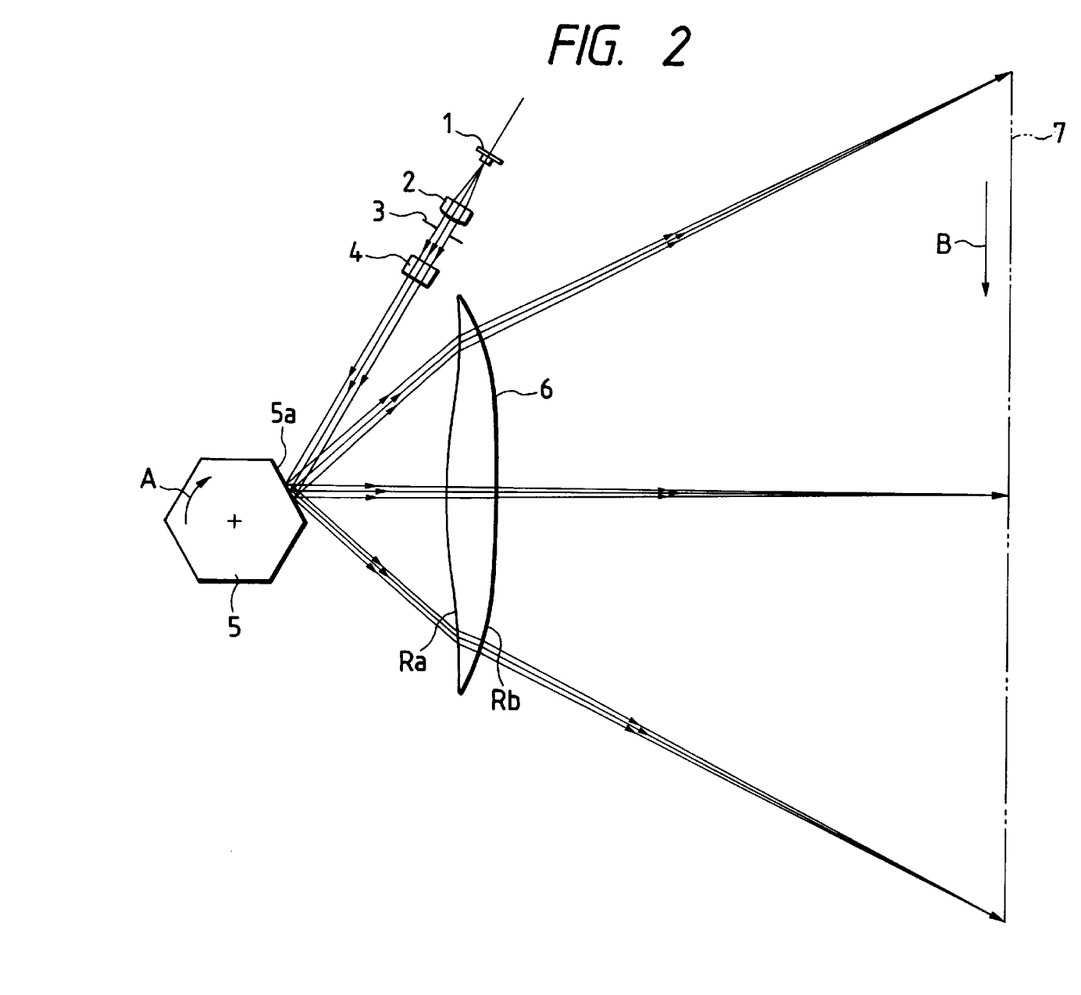
FIG. 2 is a sectional view of the main part of a scanning optical apparatus according to the first embodiment of the present invention taken along the main scanning direction.
Figure 3:
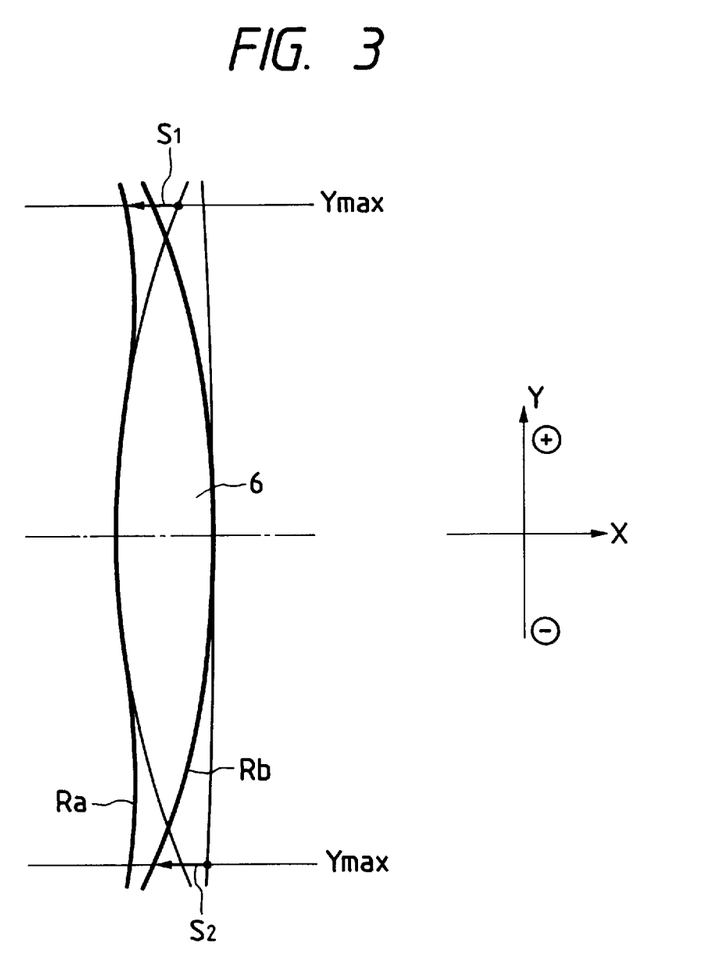
FIG. 3 is an enlarged explanatory view of an f-θ lens shown FIG. 2.

FIG. 2 is a sectional view of the main part of a scanning optical apparatus according to the first embodiment of the present invention taken along the main scanning direction. FIG. 3 is an enlarged explanatory view of an f-θ lens as the second optical element shown in FIG. 2.

The main scanning direction means a direction along which a light beam is deflected and scanned by the deflecting/reflecting surface of an optical deflector. The main scanning plane means a light beam plane formed with a function of time by a light beam reflected and deflected by the deflecting/reflecting surface of the optical deflector.

In FIG. 2, a light source means 1 is constituted by, e.g., a semiconductor laser. A collimator lens 2 serving as the first optical element (first optical system) converts a light beam emitted from the light source means 1 into a focused beam on the main scanning plane. An aperture stop 3 equalizes the diameters of passing light beams.

A cylindrical lens 4 serving as the third optical element (third optical system) has a predetermined refracting power only in the sub scanning direction and forms the light beam passing through the aperture stop 3 into an almost line image on a deflecting/reflecting surface 5a of an optical deflector 5 (to be described later) in the sub scanning section. Therefore, the light beam incident on the optical deflector 5 is converted into a line image long in the main scanning direction.

The optical deflector 5 is constituted by, e.g., a polygon mirror (rotary polygonal mirror) serving as a deflection element and rotated by a driving means (not shown) such as a motor in a direction indicated by an arrow A at a predetermined speed.

An f-θ lens 6 (imaging optical system) serving as the second optical element (second optical system) is constituted by a single lens having an f-θ characteristic. Each of a lens surface Ra on the optical deflector 5 side (the light beam incidence side) and a lens surface Rb on a surface 7 to be scanned-side (light beam exit side) of the f-θ lens 6 is constituted by an aspherical toric surface in the main scanning plane. A light beam which is deflectively reflected by the optical deflector 5 on the basis of image information is formed into an image on the photosensitive drum surface 7, i.e., the surface to be scanned serving as a recording medium, through the f-θ lens. The f-θ lens 6 also corrects the tilt of the deflecting surface of the optical deflector 5.

In the first embodiment, the curvature of at least one of the lens surfaces Ra and Rb of the f-θ lens 6 in the sub scanning plane (plane including the optical axis of the f-θ lens 6 and perpendicular to the main scanning plane) is continuously changed from the on-axis point to the off-axis point within the effective range of the lens surface. With this arrangement, the curvature of field in the sub scanning direction is satisfactorily corrected. In addition, the optical axis of the f-θ lens 6 (symmetrical axis of the f-θ lens 6 in the main scanning direction) is tilted in the main scanning plane with respect to the normal of the surface to be scanned (photosensitive drum surface) 7. With this arrangement, the f-θ characteristic is satisfactorily corrected. The shape of at least one of the lens surfaces Ra and Rb of the f-θ lens 6 is made asymmetrical with respect to the optical axis (symmetrical axis of the f-θ lens 6 in the main scanning direction) on the +Y and −Y sides.

In this embodiment, the f-θ lens 6 may be manufactured by plastic or glass molding.

In this embodiment, a light beam emitted from the semiconductor laser 1 is converted into a focused beam in the main scanning plane by the collimator lens 2. The light beam (light amount) is limited by the aperture stop 3 and incident on the cylindrical lens 4. In the main scanning section, the light beam incident on the cylindrical lens 4 directly emerges as it is. In the sub scanning section including the optical axis and perpendicular to the main scanning section, the light beam is focused and formed into an almost line image (line image long in the main scanning direction) on the deflecting surface 5a of the optical deflector 5. The light beam deflectively reflected by the deflecting surface 5a of the optical deflector 5 is guided to the photosensitive drum surface 7 through the f-θ lens 6. By rotating the optical deflector 5 in the direction indicated by the arrow A, the photosensitive drum surface 7 is optically scanned in a direction indicated by an arrow B. With this arrangement, an image is recorded on the photosensitive drum surface 7 serving as a recording medium.

A means for correcting various aberrations including distortion aberration (f-θ characteristic) and curvature of field in this embodiment will be described below.

In this embodiment, the light beam incident from the collimator lens 2 on the f-θ lens 6 through the optical deflector 5 is a focused beam in the main scanning plane. To satisfy the f-θ characteristic of this apparatus, conditions (1) and (2) below must be satisfied:

$$0 < R1 < |R2| \quad (1)$$

$$R2 < 0 \quad (2)$$

where R1 and R2 are the paraxial radii of curvature of the f-θ lens 6, in the main scanning plane, in an order from the optical deflector 5 side.

More specifically, the shape of the f-θ lens 6 is set to be biconvex such that the paraxial radius of curvature of the lens surface Ra of the f-θ lens 6 on the optical deflector 5 side is smaller than that of the lens surface Rb on the surface 7 to be scanned-side. In addition, the lens surfaces Ra and Rb have aspherical shapes. The aspherical shapes are determined such that conditions (3) and (4) below are satisfied:

$$(R1^2 - Y\max^2)^{1/2} - R1 < S1 < 0 \quad (3)$$

$$|R2| - (R2^2 - Y\max^2)^{1/2} - d < S2 < 0 \quad (4)$$

where Ymax is the maximum effective diameter in the main scanning plane, S1 and S2 are aspherical amounts from a paraxial lens surface R at the maximum effective diameter Ymax, and d is the central thickness of the f-θ lens 6. Ymax is the distance from the optical axis of the f-θ lens 6 to a position where the farthest off-axis light component passes through the f-θ lens 6.

The technical meanings of conditions (1) to (4) will be described next.

Condition (1) is a condition for satisfactorily correcting a field of curvature and a distortion aberration. If this condition is not satisfied, the field of curvature and the distortion aberration can hardly be satisfactorily corrected.

Condition (2) is a condition for satisfactorily correcting a wavefront aberration and, more particularly, for satisfactorily correcting a coma component of the wavefront aberration in the main scanning direction. In reducing the spot diameter for the purpose of a high-resolution image, or in forming an image with a scan width of A3 or larger, if condition (2) is not satisfied, the wavefront aberration and, more particularly, a coma component in the main scanning direction becomes large, resulting in a difficulty in obtaining a satisfactory spot shape.

Conditions (3) and (4) are conditions for equalizing the spot diameters depending on the image height in the sub scanning direction. When the lens shape of the f-θ lens 6 is determined such that conditions (3) and (4) are satisfied, variations at the main plane position in the sub scanning direction can be appropriately suppressed so that the spot diameters in the sub scanning direction can be equalized. If one of conditions (3) and (4) is not satisfied, the spot diameter in the sub scanning direction changes depending on the image height. Therefore, a precise and high-quality scanning optical apparatus can hardly be realized.

In this embodiment, the lens shape of the f-θ lens 6 is set such that at least one of conditions (1) to (4) is satisfied. With this arrangement, the uniformity of the spot diameter in the sub scanning direction can be improved while maintaining satisfactory curvature of field and distortion and also correcting the wavefront aberration which degrades the spot shape.

Figure 4:
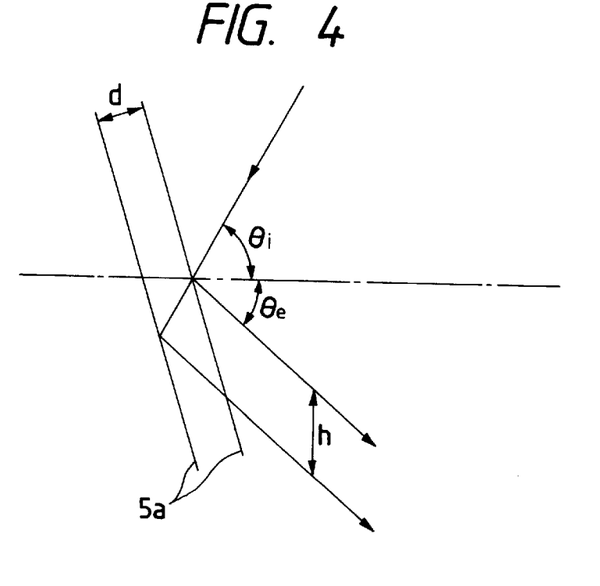
FIG. 4 is an enlarged explanatory view of part of an optical deflector shown in FIG. 2.
Figure 5:
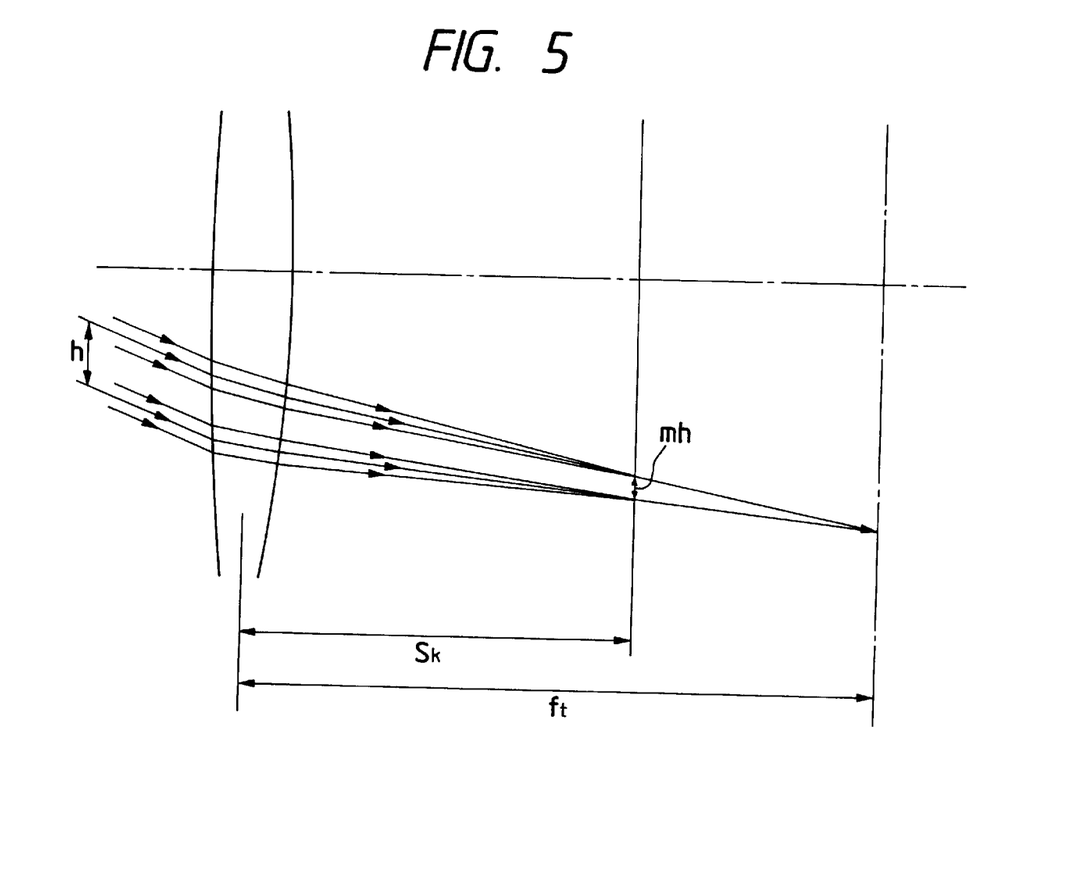
FIG. 5 is an explanatory view of a correlation between a shift between two light beams and a jitter amount in the first embodiment of the present invention.

A means for relaxing a jitter generated by the optical deflector (polygon mirror) will be described below with reference to FIGS. 4 and 5. FIGS. 4 and 5 are explanatory views in the main scanning plane.

Generally, the deflection point of the polygon mirror changes back and forth depending on a polygon surface to be used because of an error in fitting on the motor rotating shaft or a variation in distance from the center of rotation to the polygon surface (deflecting/reflecting surface) even when the light beam is to be deflected at the same deflection angle, as shown in FIG. 4. If a collimated beam is deflected by the polygon surface 5a of the polygon mirror 5 and incident on the f-θ lens 6, the light beam is formed into an image at a point on the photosensitive drum surface 7 as an image plane.

However, if a focused beam emerges from the collimator lens 2, the light beam is not formed into an image at a point on the photosensitive drum surface 7 but generates a jitter corresponding to the polygon surface period and degrades the image.

As shown in FIG. 5, a jitter amount J is given by the following equation:

$$J = mh$$

where h is the shift amount between two light beams deflected by different polygon surfaces, and m is the lateral magnification in the main scanning direction. The lateral magnification m is given by the following equation:

$$m = 1 - Sk/ft$$

where ft is the focal length in the main scanning direction (in the main scanning plane) of the f-θ lens 6, and Sk is the distance from the f-θ lens 6 (beam exit surface of the f-θ lens 6) to the surface to be scanned (photosensitive drum surface) 7. Therefore, the jitter amount J can be represented as follows:

$$J = (1 - Sk/ft)h$$

Generally, when the interval between two dots of an image shifts by an amount larger than ½ a dot, the jitter becomes conspicuous. For a scanning optical apparatus used for a laser beam printer apparatus having a resolution of, e.g., 600 dpi, the jitter becomes conspicuous when the jitter amount J is larger than a value below:

$$J = 25.4/600/2 \cong 0.02 \text{ mm}$$

To form a high-quality image, the jitter amount J must be 0.02 mm or less.

The shift amount h between two light beams shown in FIG. 4 is almost 0.04 mm or less even when the fitting error between the polygon mirror and motor rotating shaft with a normal precision or the variation in distance from the center of rotation to the polygon surface is taken into consideration.

Therefore, to obtain the jitter amount J of 0.02 mm or less, $$J = mh = m \times 0.04 \leq 0.02$$

i.e., $$m \leq 0.5$$

That is, the lateral magnification m in the main scanning direction must be 0.5 or less.

However, when the lateral magnification m in the main scanning direction is too small, the distance Sk between the f-θ lens 6 and the surface 7 to be scanned becomes large and therefore it is inconsistent with size reduction (compactness) of the apparatus. To simultaneously achieve the small lateral magnification m and size reduction of the apparatus, power arrangement of the f-θ lens 6 and the collimator lens 2 is set such that the lateral magnification m in the main scanning direction satisfies condition (5) below:

$$0.2 \leq m \leq 0.5$$

i.e., $$0.2 \leq 1 - Sk/ft \leq 0.5 \quad (5)$$

With this arrangement, a compact scanning optical apparatus can be obtained while relaxing the jitter caused by the attachment error of the polygon mirror (optical deflector) 5.

Condition (5) is a condition necessary for relaxing the jitter caused by the attachment error of the polygon mirror 5. If the lateral magnification m exceeds the upper limit value of condition (5), the jitter becomes visually conspicuous. If the lateral magnification m is smaller than the lower limit value of condition (5), the distance between the f-θ lens 6 and the surface 7 to be scanned becomes large, resulting in a difficulty in size reduction of the apparatus.

In this embodiment, the optical axis (symmetrical axis of the f-θ lens 6 along the main scanning direction) of the f-θ lens 6 is tilted in the main scanning plane with respect to the normal of the surface 7 to be scanned, as described above. With this arrangement, the asymmetrical component of the distortion aberration is satisfactorily corrected.

In this embodiment, the two lens surfaces of the f-θ lens 6 have aspherical shapes which can be represented by polynomials of tenth order at maximum. At least one of the lens surfaces Ra and Rb of the f-θ lens 6 has an asymmetrical shape with respect to the optical axis (symmetrical axis of the f-θ lens 6 along the main scanning direction) on the +Y and −Y sides. With this arrangement, particularly, the asymmetrical component of the curvature of field in the main scanning direction is satisfactorily corrected.

When the origin is set at the intersection of the lens surface of the f-θ lens 6 and the optical axis, the X-axis is set along the optical axis, and the Y-axis is set along an axis perpendicular to the optical axis in the main scanning plane, the polynomial which represents the lens surface shape in the main scanning direction can be represented by the following equation:

$$X = \frac{Y^2/R}{1 + (1 - (1+K)(Y/R)^2)^{1/2}} + B_4 Y^4 + B_6 Y^6 + B_8 Y^8 + B_{10} Y^{10}$$

(where R is the paraxial radius of curvature, and K, $B_4$, $B_6$, $B_8$, and $B_{10}$ are aspherical coefficients.)

In addition, at least one of the lens surfaces has, in the sub scanning direction, a spherical shape which continuously changes in the direction of image height. With this arrangement, the spot diameters can be further equalized in the sub scanning direction by finely changing the main plane position in the sub scanning direction.

When the radius of curvature on the optical axis in the sub scanning direction is represented by r, a radius of curvature r' on a lens surface coordinate Y in the sub scanning direction is represented by the following equation:

$$r' = r(1 + D_2 Y^2 + D_4 Y^4 + D_6 Y^6 + D_8 Y^8 + D_{10} Y^{10})$$

(where $D_2, \ldots, D_{10}$ are constants.)

Tables 1 and 2 show the lists of various coefficients representing the lens surface shapes and their characteristics in this embodiment.

As shown in FIG. 3, the lens surface is located on the upper side of the optical axis as the +Y side, and on the lower side of the optical axis as the −Y side.

TABLE 1

| Wavelength in use | λ (nm) | 780 |
|---|---|---|
| Refractive index of f-θ lens | n | 1.524 |
| Incident angle of polygon | θi | −60 |
| Maximum exit angle of polygon | θmax | 44.4 |
| Polygon - f-θ lens | e | 56.4 |
| Central thickness of f-θ lens | d | 18 |
| f-θ lens - surface to be scanned | Sk | 182.3 |
| Maximum effective diameter of f-θ lens | Ymax | 66 |
| Focal length of f-θ lens | ft | 286.1 |

| First surface | | Second surface | |
|---|---|---|---|
| R1 | 157.7898 | R2 | −2906.77192 |
| +Y | | +Y | |
| k | −2.53834E + 01 | k | 9.61598E + 02 |
| $B_4$ | −4.06974E − 07 | $B_4$ | −7.13549E − 07 |
| $B_6$ | 1.06474E − 10 | $B_6$ | 1.23674E − 10 |
| $B_8$ | −2.17181E − 14 | $B_8$ | −1.80318E − 14 |
| $B_{10}$ | 1.54696E − 18 | $B_{10}$ | 5.25726E − 19 |
| −Y | | −Y | |
| k | −1.85536E + 01 | k | −9.22960E + 01 |
| $B_4$ | −3.59189E − 07 | $B_4$ | −5.53717E − 07 |
| $B_6$ | 1.06560E − 11 | $B_6$ | 3.95364E − 11 |
| $B_8$ | 6.59385E − 15 | $B_8$ | −9.08597E − 15 |
| $B_{10}$ | −4.19705E − 19 | $B_{10}$ | 1.46878E − 18 |
| r1 | −62.8483 | r2 | −20.8954 |

TABLE 1-continued

+Y

| | | | |
|---|---|---|---|
| $D_2$ | −1.21121E − 04 | $D_2$ | 4.52157E − 05 |
| $D_4$ | 2.31256E − 07 | $D_4$ | −1.87506E − 08 |
| $D_6$ | −9.09270E − 11 | $D_6$ | 1.19357E − 11 |
| $D_8$ | 4.35855E − 14 | $D_8$ | −4.87670E − 16 |
| $D_{10}$ | −7.61332E − 18 | $D_{10}$ | −2.92009E − 19 |

−Y

| | |
|---|---|
| $D_2$ | −1.45320E − 04 |
| $D_4$ | 2.12199E − 07 |
| $D_6$ | −6.22353E − 11 |
| $D_8$ | 3.05777E − 14 |
| $D_{10}$ | −5.87962E − 18 |

TABLE 2

| | |
|---|---|
| R1 | 157.78980 |
| R2 | −2906.77192 |
| S1 (+Y) | −10.40248 |
| S1 (−Y) | −9.53712 |
| S2 (+Y) | −9.11203 |
| S2 (−Y) | −8.19786 |
| $(R1^2 − Ymax^2)^{(1/2)} − R1$ | −14.46632 |
| $(R2^2 − Ymax^2)^{(1/2)} − |R2|$ | −0.74938 |
| $1 − Sk/ft$ | 0.363 |

The element values shown in Table 2 satisfy the above-described conditions (1) to (5).

Figure 6A:
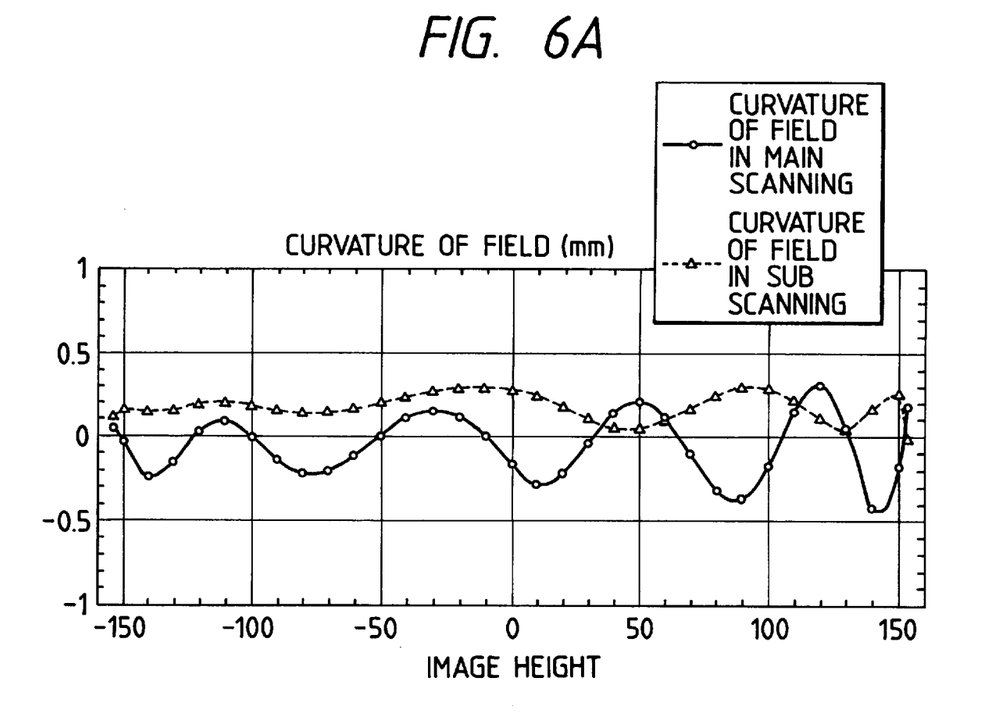
FIGS. 6A and 6B are graphs showing a curvature of field and a distortion aberration in the first embodiment of the present invention.
Figure 6B:
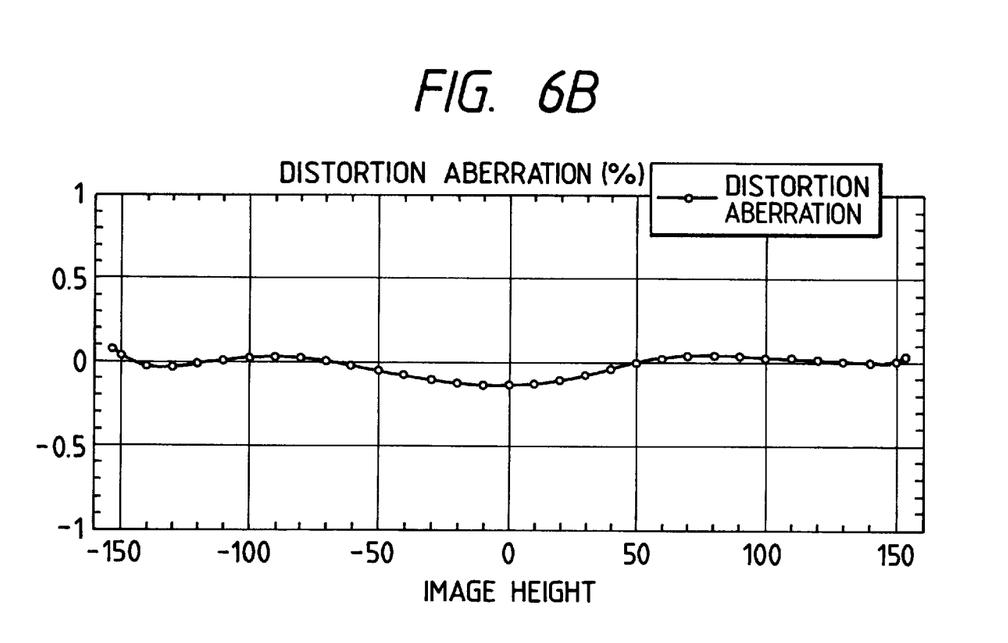

FIGS. 6A and 6B are graphs showing a curvature of field and distortion aberration (f-θ characteristic) in this embodiment. As is apparent from FIGS. 6A and 6B, both aberrations are satisfactorily corrected to levels free from practical problems. In addition, the change in spot diameter in the sub scanning direction caused by the image height is suppressed to 5 μm or less.

In this embodiment, the value (1−Sk/ft) of condition (5) is set to be 0.363. Therefore, assuming that the eccentric amount of the polygon surface 5a is 15 μm, the jitter amount generated by the attachment error of the polygon mirror is about 12 μm. The jitter can be suppressed to an unnoticeable level.

Figure 7:
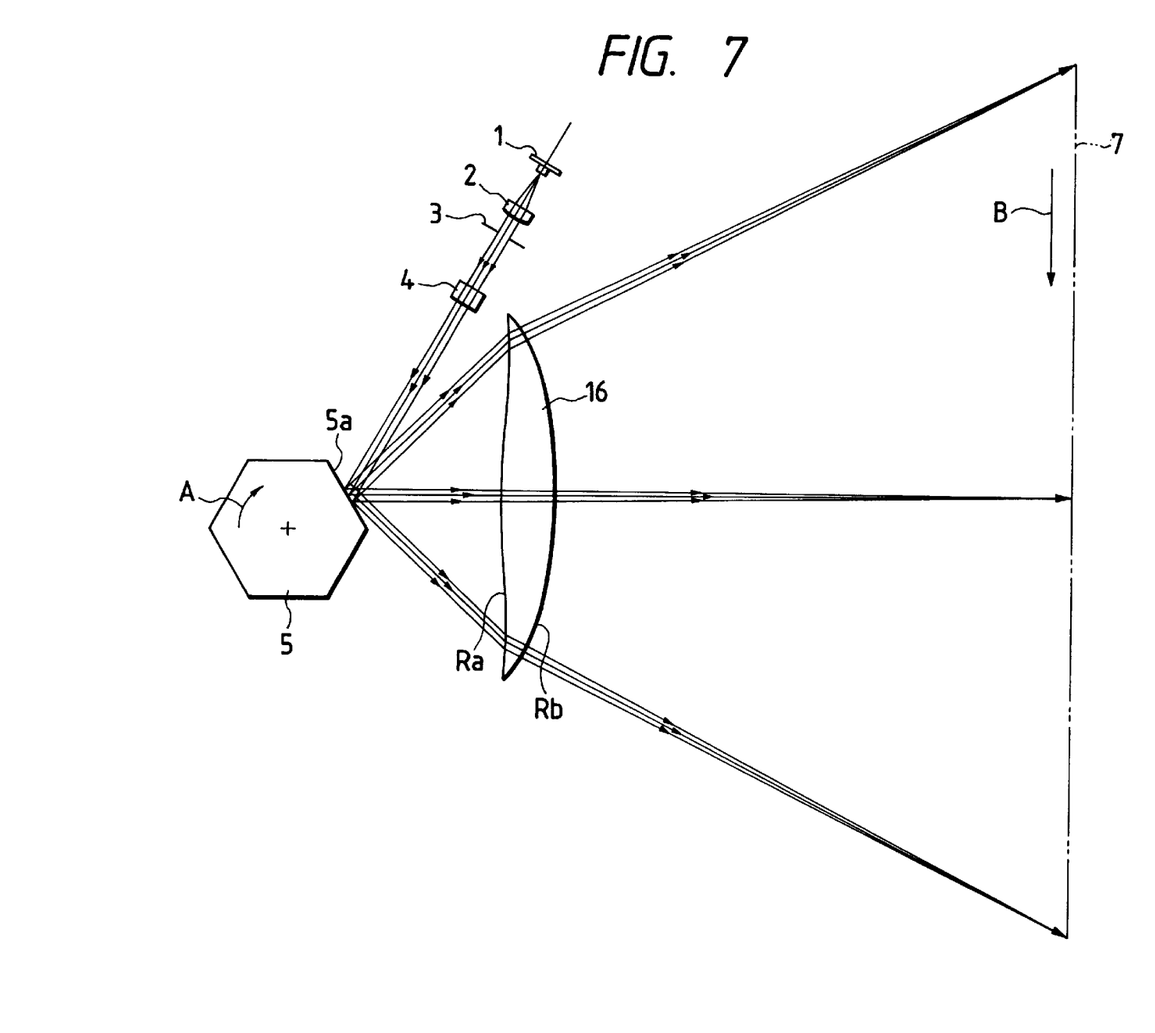
FIG. 7 is a sectional view of the main part of a scanning optical apparatus according to the second embodiment of the present invention taken along the main scanning direction.

FIG. 7 is a sectional view showing the main part of a scanning optical apparatus according to the second embodiment of the present invention taken along the main scanning direction. The same reference numerals as in FIG. 2 denote the same elements in FIG. 7.

This embodiment is different from the first embodiment in that the jitter amount is further suppressed, and the shape of a surface 7 to be scanned-side lens surface of an f-θ lens 16 is as concentric as possible with respect to an emerging light beam to further satisfactorily correct the wavefront aberration. The remaining arrangement and optical functions are almost the same as those of the first embodiment, and the same effect as described above is obtained.

Tables 3 and 4 show the lists of various coefficients representing the lens surface shapes and their characteristics in this embodiment.

TABLE 3

| | | |
|---|---|---|
| Wavelength in use | λ (nm) | 780 |
| Refractive index of f-θ lens | n | 1.525 |
| Incident angle of polygon | θi | −60 |
| Maximum exit angle of polygon | θmax | 44.4 |
| Polygon - f-θ lens | e | 56.4 |
| Central thickness of f-θ lens | d | 20 |

TABLE 3-continued

| | | |
|---|---|---|
| f-θ lens - surface to be scanned | Sk | 193.6 |
| Maximum effective diameter of f-θ lens | Ymax | 65 |
| Focal length of f-θ lens | ft | 245.1 |

| First surface | | Second surface | |
|---|---|---|---|
| R1 | 236.96067 | R2 | −273.49705 |
| +Y | | +Y | |
| k | −3.92765E + 01 | k | 6.85652E + 00 |
| $B_4$ | −2.29931E − 07 | $B_4$ | −2.43684E − 07 |
| $B_6$ | 2.44994E − 11 | $B_6$ | 3.09092E − 12 |
| $B_8$ | −3.32712E − 15 | $B_8$ | 3.43435E − 16 |
| $B_{10}$ | 1.83210E − 19 | $B_{10}$ | −3.13106E − 19 |
| −Y | | −Y | |
| k | −2.96137E + 01 | k | 6.17315E + 00 |
| $B_4$ | −2.76527E − 07 | $B_4$ | −2.38536E − 07 |
| $B_6$ | −1.03896E − 11 | $B_6$ | −1.92685E − 11 |
| $B_8$ | 3.56908E − 15 | $B_8$ | −1.99736E − 15 |
| $B_{10}$ | −1.40941E − 19 | $B_{10}$ | 8.63803E − 20 |
| r1 | −54.04 | r2 | −21.0987 |
| +Y | | | |
| $D_2$ | 1.67285E − 04 | $D_2$ | 4.14887E − 05 |
| $D_4$ | −2.69495E − 07 | $D_4$ | −3.42534E − 08 |
| $D_6$ | 1.66221E − 10 | $D_6$ | 5.67129E − 12 |
| $D_8$ | −4.34965E − 14 | $D_8$ | 1.00000E − 15 |
| $D_{10}$ | 3.97597E − 18 | $D_{10}$ | −3.00000E − 19 |
| −Y | | | |
| $D_2$ | 1.06362E − 04 | | |
| $D_4$ | −1.62579E − 07 | | |
| $D_6$ | 8.60626E − 11 | | |
| $D_8$ | −1.80019E − 14 | | |
| $D_{10}$ | 1.06830E − 18 | | |

TABLE 4

| | |
|---|---|
| R1 | 236.96670 |
| R2 | −273.49705 |
| S1 (+Y) | −6.15575 |
| S1 (−Y) | −7.43788 |
| S2 (+Y) | −5.44123 |
| S2 (−Y) | −7.11662 |
| $(R1^2 − Ymax^2)^{(1/2)} − R1$ | −9.08930 |
| $(R2^2 − Ymax^2)^{(1/2)} − |R2|$ | −7.83630 |
| $1 − Sk/ft$ | 0.210 |

The element values shown in Table 4 satisfy the above-described conditions (1) to (5).

Figure 8A:
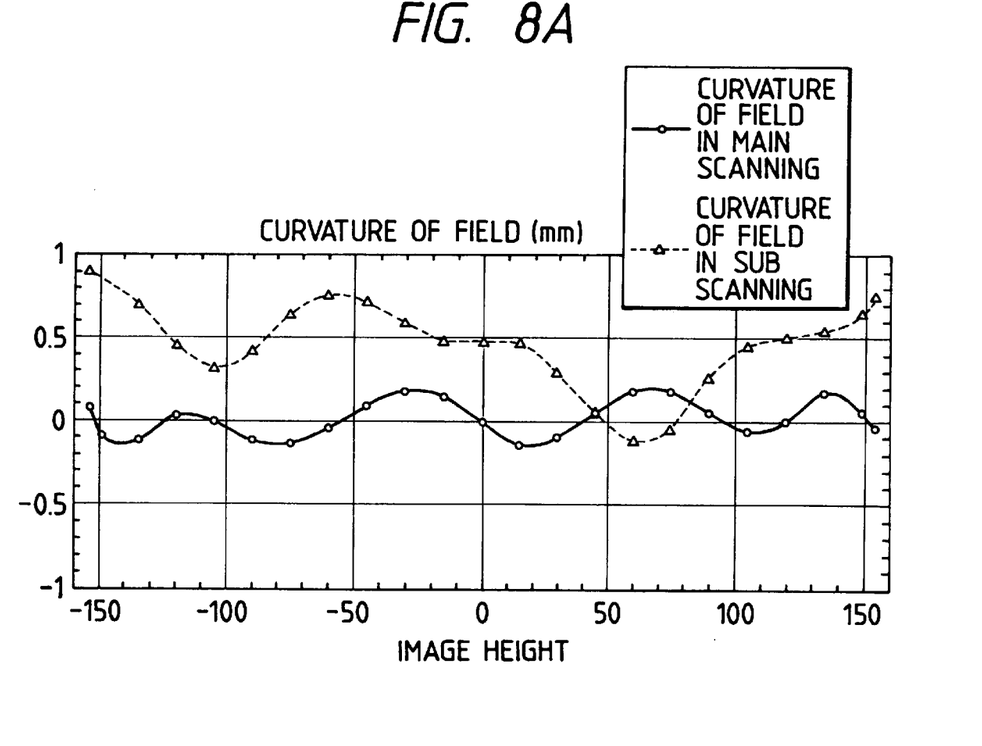
FIGS. 8A and 8B are graphs showing a curvature of field and a distortion aberration in the second embodiment of the present invention.
Figure 8B:
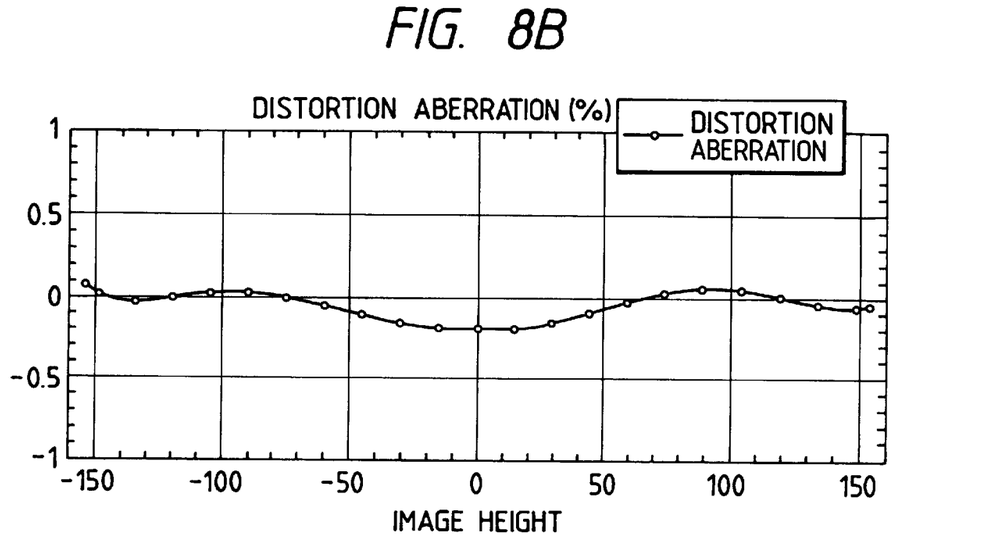

FIGS. 8A and 8B are graphs showing a curvature of field and a distortion aberration (f-θ characteristic) in the second embodiment. As is apparent from FIGS. 8A and 8B, both the aberrations are satisfactorily corrected to levels free from practical problems.

In this embodiment, the value (1−Sk/ft) of condition (5) is set to be as small as 0.21. Therefore, assuming that the eccentric amount of a polygon surface 5a is 15 μm, as in the first embodiment, the jitter amount generated by the attachment error of the polygon mirror becomes as small as 7 μm. The jitter can be further suppressed to an unnoticeable level.

As described above, according to the present invention, when the focused light beam emerging from the collimator lens is to be formed into an image on the surface to be scanned by the single f-θ lens through the optical deflector, the curvature of field, distortion aberration (f-θ characteristic), and wavefront aberration are satisfactorily corrected by appropriately setting values including the paraxial radius of curvature of the f-θ lens in the main scanning direction, aspherical amount, focal length, and distance to the surface to be scanned. In addition, the influence of the jitter caused by the attachment error of the optical deflector or change in spot diameter in the sub scanning direction caused by the image height can be minimized. With this arrangement, a compact scanning optical apparatus suitable for high-resolution printing can be achieved.

What is claimed is:

1. A scanning optical apparatus comprising:
    a light source;
    a first optical system for converting a light beam emitted from said light source into a focused beam;
    a deflector for deflecting the light beam emerging from said first optical system; and
    a second optical system for imaging the light beam deflected by said deflector into a spot image on a surface to be scanned,
    wherein said second optical system is constituted by a single lens whose two lens surfaces have aspherical shapes in a main scanning plane, and
    the following conditions are satisfied:

$$0 < R1 < |R2|$$
$$R2 < 0$$
$$(R1^2 - Y\max^2)^{1/2} - R1 < S1 < 0$$
$$|R2| - (R2^2 - Y\max^2)^{1/2} - d < S2 < 0$$
$$0.2 \leq 1 - Sk/ft \leq 0.5$$

where
   R1 is a paraxial radius of curvature of a deflector-side lens surface of said single lens,
   R2 is a paraxial radius of curvature of a surface to be scanned-side lens surface of said single lens,
   Ymax is a maximum effective diameter of said single lens in the main scanning plane,
   S1 is an aspherical amount from a paraxial lens surface of said deflector-side lens surface at the maximum effective diameter Ymax,
   S2 is an aspherical amount from a paraxial lens surface of said surface to be scanned-side lens surface at the maximum effective diameter Ymax,
   d is a central thickness of said single lens,
   ft is a focal length of said single lens in the main scanning plane, and
   Sk is a distance from said single lens to said surface to be scanned.

2. An apparatus according to claim 1, wherein said two lens surfaces of said single lens consist of aspherical toric surfaces.

3. An apparatus according to claim 1, further comprising a third optical system arranged between said first optical system and said deflector and having a refracting power only in a sub scanning direction, said third optical system forming, on a deflecting surface of said deflector, the light beam emerging from said first optical system into a linear image long in a main scanning direction.

4. An apparatus according to claim 1, wherein said first optical system converts the light beam emitted from said light source into the focused beam in the main scanning plane.

5. An apparatus according to claim 1, wherein at least one of said two lens surfaces of said single lens has, in a sub scanning plane, a curvature which continuously changes within an effective range of said single lens.

6. An apparatus according to claim 1, wherein said second optical system has an optical axis tilted in a main scanning plane with respect to a normal of said surface to be scanned.

7. An apparatus according to claim 1, wherein at least one of said two lens surfaces of said single lens has an asymmetrical shape with respect to an optical axis.

8. An apparatus according to claim 1, wherein said second optical system is manufactured by plastic molding.

9. An apparatus according to claim 1, wherein said second optical system is manufactured by glass molding.

10. A laser beam printing apparatus comprising:
    a light source;
    a first optical system for converting a light beam emitted from said light source into a focused beam;
    a deflector for deflecting the light beam emerging from said first optical system;
    a second optical system for imaging the light beam deflected by said deflector into a spot image on a surface to be scanned; and
    a photosensitive member for receiving the light beam which is deflected and scanned by said deflector,
    wherein said second optical system is constituted by a single lens whose two lens surfaces have aspherical shapes in a main scanning plane, and
    the following conditions are satisfied:

$$0 < R1 < |R2|$$
$$R2 < 0$$
$$(R1^2 - Y\max^2)^{1/2} - R1 < S1 < 0$$
$$|R2| - (R2^2 - Y\max^2)^{1/2} - d < S2 < 0$$
$$0.2 \leq 1 - Sk/ft \leq 0.5$$

where
   R1 is a paraxial radius of curvature of a deflector-side lens surface of said single lens,
   R2 is a paraxial radius of curvature of a surface to be scanned-side lens surface of said single lens,
   Ymax is a maximum effective diameter of said single lens in the main scanning plane,
   S1 is an aspherical amount from a paraxial lens surface of said deflector-side lens surface at the maximum effective diameter Ymax,
   S2 is an aspherical amount from a paraxial lens surface of said surface to be scanned-side lens surface at the maximum effective diameter Ymax,
   d is a central thickness of said single lens,
   ft is a focal length of said single lens in the main scanning plane, and
   Sk is a distance from said single lens to said surface to be scanned.

11. An apparatus according to claim 10, wherein said two lens surfaces of said single lens consist of aspherical toric surfaces.

12. An apparatus according to claim 10, further comprising a third optical system arranged between said first optical system and said deflector and having a refracting power only in a sub scanning direction, said third optical system forming, on a deflecting surface of said deflector, the light beam emerging from said first optical system into a linear image long in a main scanning direction.

13. An apparatus according to claim 10, wherein said first optical system converts the light beam emitted from said light source into the focused beam in the main scanning plane.

14. An apparatus according to claim 10, wherein at least one of said two lens surfaces of said single lens has, in a sub scanning plane, a curvature which continuously changes within an effective range of said single lens.

15. An apparatus according to claim 10, wherein said second optical system has an optical axis tilted in a main scanning plane with respect to a normal of said surface to be scanned.

16. An apparatus according to claim 10, wherein at least one of said two lens surfaces of said single lens has an asymmetrical shape with respect to an optical axis.

17. An apparatus according to claim 10, wherein said second optical system is manufactured by plastic molding.

18. An apparatus according to claim 10, wherein said second optical system is manufactured by glass molding.

* * * * *

UNITED STATES PATENT AND TRADEMARK OFFICE
CERTIFICATE OF CORRECTION

PATENT NO. : 5,812,181
DATED : September 22, 1998
INVENTOR(S) : Ishibe

It is certified that error appears in the above-identified patent and that said Letters Patent is hereby corrected as shown below:

ON THE TITLE PAGE, ITEM [57] IN THE ABSTRACT :

Please replace the existing Abstract with the following new Abstract:

--A scanning optical apparatus includes a light source, a first optical system for converting a light beam into a focused beam, a deflector for deflecting the light beam, and a second optical system for imaging the deflected light beam on a surface to be scanned. The second optical system has a single lens whose surfaces have aspherical shapes in a main scanning plane, and the following conditions are satisfied:

$0 < R1 < |R2|$; $R2 < 0$; $(R1^2 - Ymax^2)^{1/2} - R1 < S1 < 0$; $|R2| - (R2^2 - Ymax^2)^{1/2} - d < S2 < 0$; and $0.2 \leq 1 - Sk/ft \leq 0.5$, where R1 is a paraxial radius of curvature of a deflector-side lens surface of the single lens, R2 is a paraxial radius of curvature of a surface on the side of the single lens to be scanned, Ymax is a

UNITED STATES PATENT AND TRADEMARK OFFICE
CERTIFICATE OF CORRECTION

PATENT NO. : 5,812,181
DATED : September 22, 1998
INVENTOR(S) : Ishibe

It is certified that error appears in the above-identified patent and that said Letters Patent is hereby corrected as shown below:

maximum effective diameter of the single lens in the main scanning plane, S1 and S2 are aspherical amounts, S1 from a paraxial lens surface of the deflector-side lens surface, and S2 from a paraxial lens surface of the surface to be scanned, at the maximum effective diameter Ymax, d is a central thickness of the single lens, ft is a focal length of the single lens in the main scanning plane, and Sk is a distance from the single lens to the surface to be scanned.--

COLUMN 1:

Line 37, an almost" should read --almost a--; and

COLUMN 2:

Line 48, "prevent a" should read --to prevent--.

COLUMN 4:

Line 42, "an almost" should read --almost a--.

UNITED STATES PATENT AND TRADEMARK OFFICE
CERTIFICATE OF CORRECTION

PATENT NO. : 5,812,181
DATED : September 22, 1998
INVENTOR(S) : Ishibe

It is certified that error appears in the above-identified patent and that said Letters Patent is hereby corrected as shown below:

COLUMN 5:

Line 57, "scanned-side." should read --scanned.--.

COLUMN 6:

Line 38, "a" should be deleted; and
Line 55, "a" should be deleted.

Signed and Sealed this

Sixth Day of July, 1999

Attest:

Q. TODD DICKINSON

*Attesting Officer*    Acting Commissioner of Patents and Trademarks